United States Patent
Graber et al.

(10) Patent No.: US 11,558,279 B2
(45) Date of Patent: Jan. 17, 2023

(54) METHOD AND ACCESS UNIT FOR ACCESSING INDUSTRIAL COMMUNICATION NETWORKS

(71) Applicant: Hitachi Energy Switzerland AG, Baden (CH)

(72) Inventors: Dominique Graber, Freienwil (CH); Michael Obrist, Untersiggenthal (CH); Stefan Meier, Klingnau (CH); Stephan Gerspach, Herrischried (DE); Wolfgang Wimmer, Langenthal (CH)

(73) Assignee: Hitachi Energy Switzerland Ltd, Baden (CH)

( * ) Notice: Subject to any disclaimer, the term of this patent is extended or adjusted under 35 U.S.C. 154(b) by 95 days.

(21) Appl. No.: 16/683,366

(22) Filed: Nov. 14, 2019

(65) Prior Publication Data

US 2020/0084134 A1  Mar. 12, 2020

Related U.S. Application Data

(63) Continuation of application No. PCT/EP2018/062063, filed on May 9, 2018.

(30) Foreign Application Priority Data

May 17, 2017  (EP) .................................... 17171543

(51) Int. Cl.
*H04L 43/50* (2022.01)
*H04L 9/40* (2022.01)
(Continued)

(52) U.S. Cl.
CPC .............. *H04L 43/50* (2013.01); *G06F 11/00* (2013.01); *H04L 63/0876* (2013.01);
(Continued)

(58) Field of Classification Search
CPC ..... H04L 43/50; H04L 43/00; H04L 63/0876; H04L 2012/4026; H04L 67/12;
(Continued)

(56) References Cited

U.S. PATENT DOCUMENTS

| | | | |
|---|---|---|---|
| 7,158,613 B2 * | 1/2007 | Dunbar | H04M 3/323 370/251 |
| 2004/0142687 A1 * | 7/2004 | Richards | H04L 43/50 455/423 |

(Continued)

FOREIGN PATENT DOCUMENTS

| | | |
|---|---|---|
| CN | 106291254 A | 1/2017 |
| CN | 106353538 A | 1/2017 |

(Continued)

OTHER PUBLICATIONS

Ferrazani Mattos, D.M., Duarte, O.C.M.B. AuthFlow: authentication and access control mechanism for software defined networking. Ann. Telecommun. 71, pp. 607-615 (2016). https://doi.org/10.1007/s12243-016-0505-z (Year: 2016).*

(Continued)

*Primary Examiner* — Glenton B Burgess
*Assistant Examiner* — Rachel J Hackenberg
(74) *Attorney, Agent, or Firm* — Slater Matsil, LLP

(57) ABSTRACT

A method and an access unit for accessing an industrial communication network are provided. An access unit has first ports connected to the communication network and at least one second port. The access unit is configured to pass data traffic between nodes of the communication network through the access unit in a first operational state of the access unit. The access unit is configured to pass data traffic to a test node via the at least one second port and/or allow (Continued)

test data to be injected into the communication network via the at least one second port in a second operational state of the access unit.

20 Claims, 9 Drawing Sheets

(51) Int. Cl.
*G06F 11/00* (2006.01)
*G06F 11/30* (2006.01)
*G06F 13/00* (2006.01)

(52) U.S. Cl.
CPC .... *G05B 2219/33331* (2013.01); *G06F 11/30* (2013.01); *G06F 13/00* (2013.01)

(58) Field of Classification Search
CPC .... G06F 11/00; G06F 11/0766; G06F 11/366; G06F 11/3688; G06F 11/2736; G06F 11/3062; G06F 11/2221; G06F 11/221; G06F 11/22; G06F 11/3409; G06F 13/4022; G06F 13/4027; G06F 2211/005; G05B 23/02; G05B 2219/33331; G05B 19/0428; G05B 23/0256
See application file for complete search history.

(56) References Cited

U.S. PATENT DOCUMENTS

| 2008/0247416 | A1  |   | 10/2008 | Gentieu et al. |
|---|---|---|---|---|
| 2014/0058689 | A1 | * | 2/2014 | Klien .................. H04L 41/0631 |
|  |  |  |  | 702/60 |
| 2015/0180760 | A1 |   | 6/2015 | Rickard |

FOREIGN PATENT DOCUMENTS

| JP | 2005278054 A | * | 10/2005 |
|---|---|---|---|
| WO | 0229931 A2 |  | 4/2002 |
| WO | 2005074244 A1 |  | 4/2004 |
| WO | 2009053488 A1 |  | 4/2009 |

OTHER PUBLICATIONS

European Patent Office, International Search Report & Written Opinion issued in corresponding Application No. PCT/EP2018/062063, dated Jun. 25, 2018, 12 pp.

European Patent Office, Extended Search Report issued in corresponding Application No. 17171543.6, dated Jul. 4, 2017, 8 pp.

* cited by examiner

METHOD AND ACCESS UNIT FOR ACCESSING INDUSTRIAL COMMUNICATION NETWORKS

FIELD OF THE INVENTION

Embodiments of the invention relate to methods, access units and systems for testing, commissioning or maintenance of nodes of an industrial communication network. Embodiments of the invention relate to methods, access units and systems for testing, commissioning or maintenance of nodes of an industrial communication network in accordance with IEC 62439-3 or IEC 61850. Exemplary embodiments of the invention relate to methods and access units for accessing the communication network of Substation Automation (SA) systems. More particularly, exemplary embodiments of the invention relate to a method and an access unit that allow substation testing, commissioning or maintenance to be performed by injecting simulated digital test data into a communication network and/or by monitoring data traffic in the communication network during testing, commissioning or maintenance.

BACKGROUND OF THE INVENTION

Industrial communication networks are widely used. Such communication networks may have the topology of a High-availability Seamless Redundancy (HSR) ring in accordance with IEC 62439-3.

Substations in high and medium voltage power networks are an exemplary field in which such communication networks may be used. Such substations include primary devices such as electrical cables, lines, bus bars, switches, power transformers and instrument transformers, which are generally arranged in switch yards and/or bays. These primary devices are operated in an automated way via a Substation Automation (SA) system. The SA system comprises secondary devices, which may include Intelligent Electronic Devices (IED), responsible for the protection, control and monitoring of the primary devices. Protection devices, such as protection relays, bay controllers or revenue meters are exemplary for secondary devices.

A SA system is operative to process currents, voltages, and binary information, e.g., the position indication of circuit breakers and disconnectors. In a conventional SA system, this information has been provided via copper wires from the primary process interfaces to the control and protection IEDs. Especially for protection IEDs, a test switch may be installed to interrupt the connection of the IED to the instrument transformers, directly located on the primary equipment, and to allow a test equipment to be connected to inject simulated currents and voltages to the device under test.

For a digital substation, I/O units that collect the currents, voltages and other information, such as binary information indicating the state of circuit breakers and disconnectors, are located on process level and the relevant information is provided by communication links to the SA system. The communication links may be based on Ethernet and may be implemented as point-to-point connections, switched networks, or High-availability Seamless Redundancy (HSR) rings. The physical layer may be based on fiber optic connections or electrical connections.

WO 2009/053488 A1 discloses a method of operating a SA system with a standardized configuration description. During maintenance, commissioning and fault situations when one or several IEDs are inoperable, the data that these IEDs would have produced is substituted to ensure availability of the substation. To this effect, a dedicated substitute device is permanently installed that can take the role of any IED. The dedicated substitute device is an active device. The provision of the active substitute device that remains permanently installed may add to the costs of the testing infrastructure.

US 2015/0180760 A1 discloses a network test system that improves visibility into the real-time operation of a network system or subsystem of a spacecraft through the use of a port from each relevant network to a spacecraft test interface.

US 2008/0247416 A1 discloses a network diagnostic component and related circuit for tapping a line in the network diagnostic component.

FIG. 18 and FIG. 19 schematically illustrate a prior art technique of testing a SA system that has HSR ring topology. Plural HSR nodes 41-44 are connected to an HSR process bus. A first HSR node 41 and a fourth HSR node 44 are connected by a connection 111 which may be a fiber optic connection or an electrical connection. The HSR ring is a closed ring network. A test node 112 must be inserted to analyse the network traffic and/or to inject simulated test data. Conventionally, this requires the connection 111 on at least one of the nodes 41-44 to be removed. FIG. 19 schematically illustrates the SA system when a test node 112 has been inserted into the HSR ring. The connection 111 needs to be disconnected from the HSR node 41 and must be connected to the test node 112, as schematically illustrated by the broken arrow 113. A new connection 114 must be inserted. Various shortcomings are associated with such a procedure. For illustration, access to the installed HSR nodes 41, 44 may be limited due to installation space, making it challenging to access HSR nodes 41-44. This may apply in particular in case the nodes 41-44 are installed in an area with limited access, like on process level. Insertion of the test node 112 can modify the behaviour of the SA system. After completion of the test, the test node 112 is removed again from the SA system. There is a risk that the connection 111 will not be re-installed correctly. As a consequence of the complexity of these processes, the HSR ring may be open for several seconds up to minutes also for the normal operation, leading to higher probability of failure.

SUMMARY

It is an objective of the invention to provide improved methods, devices and systems for accessing industrial communication networks. It is an objective of the invention to provide improved methods, access units and systems that facilitate accessing industrial communication networks having an HSR ring topology. It is an objective of the invention to provide methods, access units and systems that can be used for testing, commissioning or maintenance of a substation automation (SA) system. It is in particular an objective to provide methods, access units and systems that facilitate the connection of a test node for testing, commissioning or maintenance, to mitigate the risk of inadvertent modification of the industrial communication network, and/or to reduce the time in which communication links are interrupted when a test node is coupled to the SA system.

According to embodiments, an access unit is installed in an industrial communication network. The access unit has first ports that remain connected to the communication network even in a normal operational phase in which no testing is performed. The first ports may remain connected to the communication network during normal ongoing operation of a SA system or other industrial installation, in which no testing, commissioning and/or maintenance is performed. The access unit has at least one second port. When testing, commissioning and/or maintenance is performed, data traffic between nodes of the communication network is passed to a test node via the at least one second node. Alternatively or additionally, test data can be injected into the communication network via the at least one second node. When no testing is performed, the data traffic between the nodes of the communication network is simply passed through the access unit.

The access unit may be configured to pass the data traffic through the access unit between its two first ports using passive components only.

The access unit may be a DANH (Doubly Attached Node with HSR protocol). The access unit may be a DANH in accordance with IEC 62439-3. The access unit may be a DANH in accordance with clause 5.2 of IEC 62439-3:2016.

The access unit may be configured to operate on the physical layer only when passing the data traffic through the access unit between its two first ports. The access unit may be configured to operate on the physical layer of the OSI layer model to pass the data traffic between nodes of the communication network through the access unit. The access unit may be configured to pass the data traffic between nodes of the communication network without performing data processing or manipulation on the DataLink layer or higher layers of the OSI layer model. The access unit may be configured to pass the data traffic between nodes of the communication network without performing data processing or manipulation on any one of the Application, Presentation, Session, Transport, Network and DataLink layers.

The access unit may provide a short-circuit connection on the physical layer between the first ports of the access unit, at least when the access unit is in the first operational state. The access unit may optionally also provide a short-circuit connection on the physical layer between the first ports of the access unit when the access unit is in the second operational state while testing, commissioning and/or maintenance is performed.

The access unit may be implemented as a Quadbox.

The communication network may be a communication network in accordance with IEC 62439-3 or IEC 61850. The communication network may be a communication network in accordance with IEC 62439-3:2016. The communication network may be a communication network in accordance with IEC 61850-8-1:2011 and IEC 61850-9-2:2011.

According to an embodiment, a method of accessing an industrial communication network is provided. The method uses the access unit having first ports and at least one second port, the first ports remaining connected to the communication network during an operational phase in which no testing is performed. The method comprises passing data traffic between nodes of the communication network through the access unit between the first ports of the access unit in a first operational state of the access unit. The method comprises passing the data traffic to a test node via the at least one second port of the access unit and/or allowing test data to be injected into the communication network via the at least one second port of the access unit in a second operational state of the access unit.

The first operational state of the access unit may be a state in which no testing, commissioning and/or maintenance of the nodes of the communication network is performed. The access unit may be brought to the second operational state selectively only while testing, commissioning and/or maintenance of the nodes of the communication network is performed.

The connections between the access unit and the other nodes of the communication network do not need to be altered to perform testing, commissioning and/or maintenance.

In the first operational state of the access unit, the data traffic may be passed between the first ports of the access unit through the access unit using passive components only that do not perform data processing and/or data manipulation.

The access unit may comprise a first component having the first ports. The access unit may comprise at least one further component releasably connectable to the first component.

The first component may be a passive component that does not have any power consumption when passing the data traffic through the access unit. The first component may be permanently installed in the communication network in the sense that it remains connected to the other nodes of the communication network even when no testing, commissioning, and/or maintenance is performed. In a first operational state of the access unit, in which the industrial installation is in a normal operation mode and no testing, commissioning, and/or maintenance is performed, data traffic of a communication network may be passed through the access unit using passive elements only.

The method may further comprise connecting the at least one further component of the access unit to the first component to set the access unit to one of the first operational state or the second operational state. The at least one further component may be mechanically engaged with the first component to bring the access unit to the first operational state or the second operational state.

The at least one further component may comprise a second component having the at least one second port. The second component may be connected to the first component in at least the second operational state of the access unit to pass the data traffic to the test node and/or to allow the test data to be injected into the communication network via the at least one second port of the access unit.

The second component of the access unit may be selectively mechanically engaged with the passive first component to bring the access unit to a second operational state in which testing, commissioning, and/or maintenance may be performed. The second component may be a passive second component or may include an active circuit, such as a data concentrator. The second component, when engaged with the first component, may allow a test node to be coupled to the communication network, with the data traffic being provided to the test node through the first component and the second component. Alternatively or additionally, the second component, when engaged with the first component, may allow the test node to inject test data into the communication network.

The first component and the second component of the access unit may be configured for mating engagement with each other. The first component may be a passive socket and the second component may be a plug that may be selectively inserted into the passive socket for testing, commissioning or maintenance. The second component of the access unit may be disengaged and removed from the first component when no testing, commissioning or maintenance is performed.

Alternatively or additionally, the access unit may comprise a third component. The third component may be connected to the first component in the first operational state of the access unit to pass the data traffic between the nodes between the first ports of the access unit through the access unit.

The third component may be mechanically engaged with the first component when the industrial installation is in a normal operation mode and no testing, commissioning, or maintenance is performed. The third component may be a passive third component that does not include any components performing data processing and/or manipulation. The third component may provide a short-circuit connection between the first ports of the access unit when no testing, commissioning, or maintenance is performed.

The method may further comprise performing an authentication procedure when the at least one further component is connected to the first component to prevent unauthorized access to the communication network.

According to an embodiment, the access unit for accessing an industrial communication network has first ports configured for being connected to the communication network and at least one second port. The access unit is configured to pass data traffic between nodes of the communication network through the access unit between the first ports of the access unit in a first operational state of the access unit. The access unit is configured to pass data traffic to a test node via the at least one second port and/or allow test data to be injected into the communication network via the at least one second port in a second operational state of the access unit.

The access unit may be configured to pass the data traffic between the first ports of the access unit through the access unit using passive components only.

The access unit may comprise an electrical or optical short-circuit connection between the first ports. The electrical or optical short-circuit may be operative to pass the data traffic through the access unit on the physical layer. The electrical or optical short-circuit may be operative to pass the data traffic through the access unit without performing data processing or manipulation on the DataLink layer and on higher layers.

The access unit may be configured to operate on the physical layer only when passing the data traffic through the access unit.

The access unit may comprises a first component having the first ports and at least one further component that is releasably connectable to the first component to set the access unit to one of the first operational state or the second operational state. The at least one further component may be releasably mechanically engageable with the first component.

The at least one further component may comprises a second component configured to be connected to the first component in the second operational state of the access unit, the second component having the at least one second port to pass the data traffic to the test node and/or to allow the test data to be injected into the communication network.

In the second operational state of the access unit, in which the second component is engaged with the first component of the access unit, the access unit may optionally be configured to pass the data traffic through the access unit between the first ports of the access unit. To this end, the first component or the second component may include a splitter and, preferably, a pair of splitters. The first component or the second component may include an optical or electrical short-circuit connection coupled to the splitters.

Additionally or alternatively, the at least one further component may comprises a third component configured to be releasably connected to the first component in the first operational state of the access unit to enable the data traffic to pass between the first ports of the access unit through the access unit.

The third component may include an optical or electrical short-circuit connection to pass the data traffic between the first ports of the access unit through the access unit in the first operational state of the access unit.

The first component may include a socket and the at least one further component includes a plug mating with the socket for connecting the at least one further component with the first component.

The access unit may comprise a splitter. The access unit may comprise two splitters provided in the passive first component or in the second component. The splitters may be electrical or optical splitters.

The access unit may comprise an electrical or optical short-circuit connection to pass the data traffic between the two first ports in the first operational state of the access unit.

The access unit may be configured such that engagement of the second component with the first component automatically causes the short-circuit connection included in the passive first component to be interrupted.

A kit according to an embodiment comprises the access unit of any one of the embodiments disclosed herein, and a test node. The test node is configured to be coupled to the access unit to analyze the data traffic of the communication network and/or to generate the test data for injection into the communication network.

The test node may be configured to emulate one, plural or all of the devices connected to the communication network. The test node may be configured to process and/or generate messages in accordance with IEC 61850. The test or commissioning device may be configured to process and/or generate messages in accordance with IEC 61850-8-1:2011 and/or IEC 61850-9-2:2011.

A digital substation according to an embodiment comprises a plurality of IEDs, a communication network to which the IEDs are coupled, and the access unit of any one of the embodiments disclosed herein. The first component of the access unit remains permanently coupled to the communication network even while no testing, commissioning and/or maintenance is performed.

The communication network may have HSR ring topology. The communication network may be a communication network in accordance with IEC 62439-3 and/or IEC 61850-9-2. The communication network may be a communication network in accordance with IEC 62439-3:2016. The communication network may be a communication network in accordance with IEC 61850-8-1:2011 and/or IEC 61850-9-2:2011.

The communication network may be based on Ethernet point-to-point connections.

The method, access unit, kit and system according to the embodiments disclosed herein provides an access point to the process bus and therefore mitigates the problems associated with reduced availability of the system. The access unit can be used to connect any maintenance or test node to a process bus or other industrial communication network. At least in the first operational state, the access unit is operative to keep a point-to-point connection or High-availability Seamless Redundancy (HSR) ring closed by using passive components only. This can be achieved for networks that are based on the electrical or optical physical layer.

The access unit may be particularly suitable for use with a process bus having point-to-point communication links or having HSR ring topology, without being limited thereto.

The access unit may therefore be considered to be a Digital Substation Test Switch that has a purpose somewhat similar to a conventional test switch for testing non-digital substations. However, the access unit provides additional functionality, such as passing data packets of the data traffic in the communication network through the access unit, thereby maintaining communication links between nodes of the communication network operative.

The methods, access units, and systems allow testing, commissioning or maintenance to be performed without requiring communication network cables to be disconnected from and reconnected to any one of nodes communicatively connected via the communication network. As the passive first component of the access unit remains permanently integrated in the communication network even while no testing, commissioning and/or maintenance is performed, it is not required to disconnect and/or reconnect nodes such as Intelligent Electronic Devices (IEDs), merging units, or other devices of the SA system for testing, commissioning or maintenance. The risk of inadvertently modifying the SA system is mitigated. In order to connect the test device to the communication network, it is only required to ensure that the second component of the access unit is connected to the first component, such as by inserting a plug into a passive socket. The time in which communication links are interrupted for coupling a test device to the communication network is reduced.

The methods, devices, and systems are particularly suitable for use with a process bus of a SA system that has HSR ring topology, without being limited thereto. In preferred embodiments, at least the first component of the access unit is passive, i.e., it has no electronic components that require power supply and it does not require any power supply to pass data traffic through the access unit. Thus, availability and reliability of an HSR ring or other industrial communication network may be enhanced, while still facilitating a test node to be connected to the communication network. In some embodiments, the second and/or, where available, third component of the access unit may also be passive, i.e., have no electronic components that require power supply and do not require any power supply to pass data traffic through the access unit.

BRIEF DESCRIPTION OF THE DRAWINGS

The subject matter of the invention will be explained in more detail with reference to preferred exemplary embodiments which are illustrated in the attached drawings, in which.

DETAILED DESCRIPTION OF EMBODIMENTS

Exemplary embodiments of the invention will be described with reference to the drawings in which identical or similar reference signs designate identical or similar elements. While some embodiments will be described in the context of a High-availability Seamless Redundancy (HSR) process bus and/or with reference to specific exemplary substation automation (SA) system devices such as a merging unit (MU), an Intelligent Electronic Device (IED), or a Breaker IED (BIED), the embodiments are not limited thereto. Rather, embodiments of the invention may be used for a wide variety of industrial communication networks, such as HSR rings comprising nodes in accordance with IEC 62439-3. The features of embodiments may be combined with each other, unless specifically noted otherwise.

Figure 1:
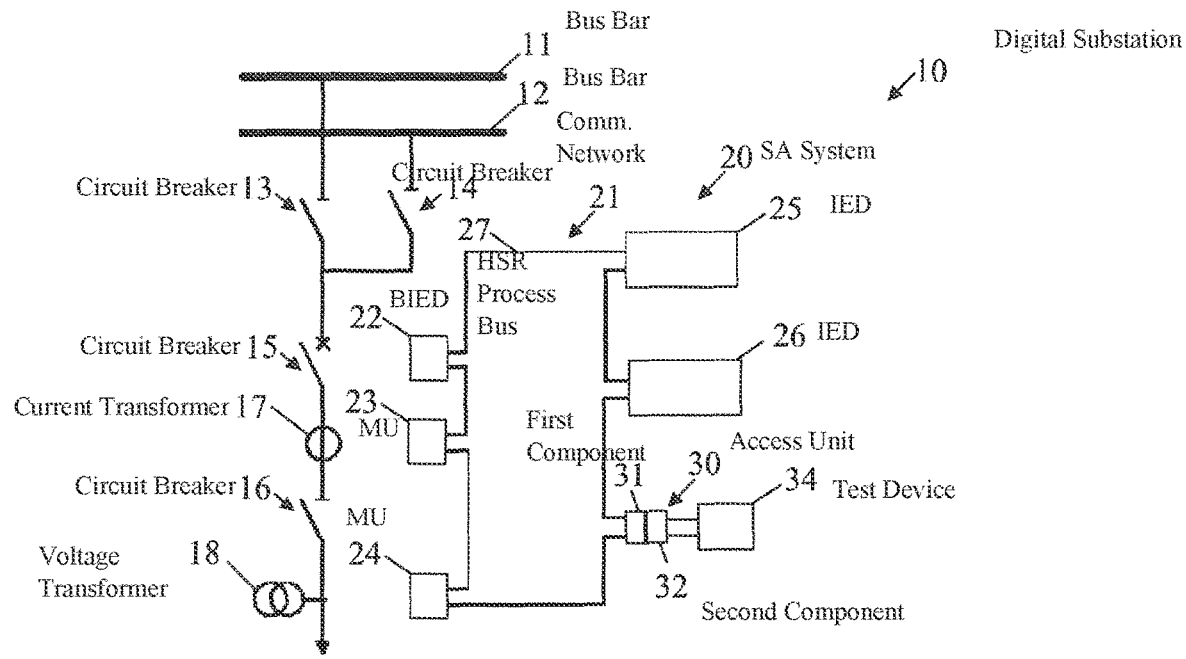
FIG. 1 is a schematic representation of a digital substation comprising an access unit according to an embodiment when the access unit is in a second operational state for testing, commissioning or maintenance.

FIG. 1 shows a schematic representation of a digital substation 10 when testing, commissioning and/or maintenance is performed. The digital substation may include bus bars 11, 12, circuit breakers 13-16, a current transformer 17, and/or a voltage transformer 18. The digital substation 10 has a SA system 20. The SA system 20 has a communication network 21. In case of a digital substation, I/O units that collect currents, voltages and/or binary information are located on process level and provide information thereon by communication links. The communication links may be based on Ethernet and could be point-to-point connections, switched networks or HSR rings. The physical layer may be based on fiber optic or electrical connections. The SA system 20 includes a BIED 22, MUs 23, 24, and IEDs 25, 26. The communication network 21 may comprise an HSR process bus 27, for example. Other network topologies may be used.

An access unit 30 has a first component 31 that remains permanently inserted into one of the communication links of the communication network 20. The first component 31 remains installed in the SA system 20 even in normal operation when no testing, commissioning or maintenance is performed.

The access unit 30 may have a second component 32. When testing, commissioning or maintenance is performed, the second component 32 may be connected to the first component 31. The state of the access unit 30 in which the second component 32 is engaged with the first component is also referred to as a second operational state of the access unit 30 herein. In the second operational state of the access unit 30, the second component 32 may be mechanically mounted to and electrically or optically coupled with the first component 31. In some implementations, the first component 31 may be configured as a socket and the second component 32 may be configured as a plug that is inserted into the socket when testing, commissioning or maintenance is to be performed. Engagement of the second component 32 with the first component 31 allows a test node 34 connected to the access unit 30 to monitor the data traffic in the communication network 20. Alternatively or additionally, the test node 34 may inject test data into the communication network 20 via the access unit 30.

The first component 31 may be a passive component that has zero power consumption. The first component 31 may be incapable of modifying or otherwise processing data packets transmitted in the communication network. The first component 31 may operate on the physical layer of the OSI layer model only. The first component 31 may be incapable of processing and modifying data packets passing through the first component 31 on the DataLink layer and/or on even higher layers of the OSI layer model.

The second component 32 may be a passive component that has zero power consumption. The second component 32 may be incapable of modifying or otherwise processing data packets transmitted in the communication network. The second component 32 may operate on the physical layer of the OSI layer model only. In other embodiments, the second component 32 may include at least one active circuit, such as a data concentrator for data alignment or an authentication circuit that prevents fraudulent use of the access unit 30.

The access unit 30 in the second operational state depicted in FIG. 1 may be operative to pass data packets transmitted in the HSR process bus 27 to the test node 34 for analysis, for example. Alternatively or additionally, the access unit 30 in the second operational state depicted in FIG. 1 may be operative to pass test data generated by the test node 34 through the access unit 30 to the HSR process bus 27 for injection of the test data.

Figure 2:
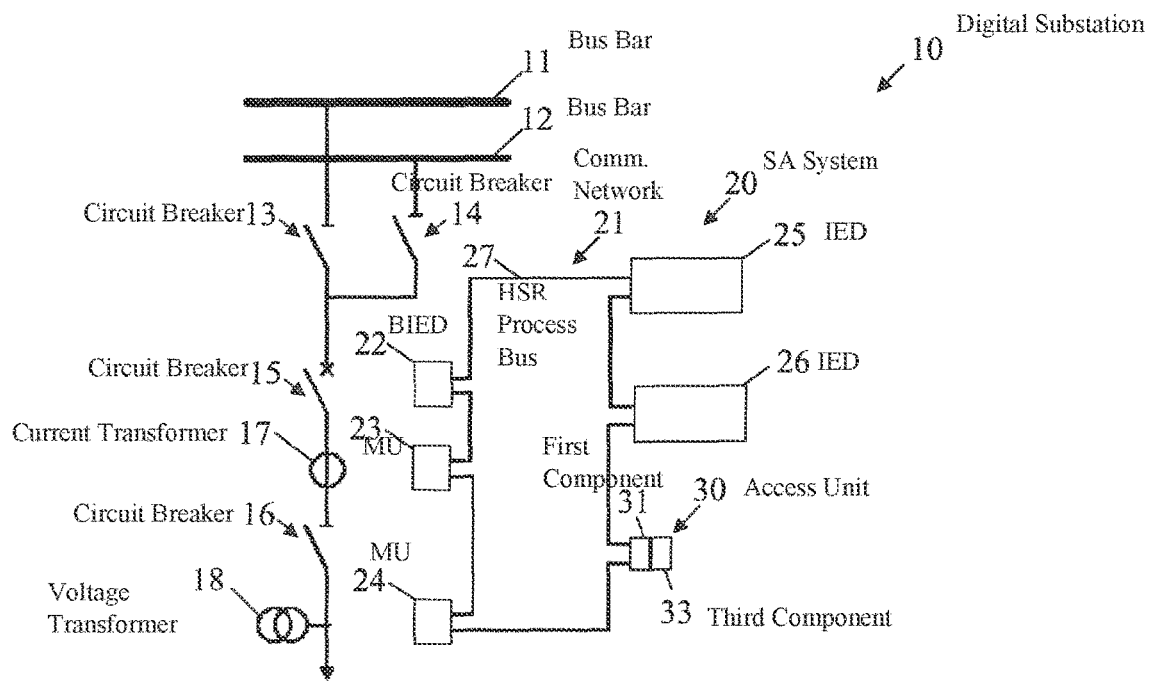
FIG. 2 is a schematic representation of the digital substation of FIG. 1 when the access unit is in a first operational state in which no testing, commissioning or maintenance is performed.

During normal operation of the SA system, i.e., when no testing, commissioning or maintenance is performed, the second component 32 may optionally be disconnected and removed from the first component 31 of the access unit. For a plug-socket-type connection, the plug formed by the second component 32 may be unplugged from the socket formed by the first component 31. The first component 31 remains installed in the SA system 31 even when no testing, commissioning or maintenance is performed. This is illustrated in FIG. 2 which shows the digital substation 10 in normal operation, when no testing is performed.

During normal operation of the SA system 31, the access unit 30 is in a first operational state and may be a fully passive device, having zero power consumption. The access unit 30 may be operative to pass data packets transmitted in the HSR bus 27 through the access unit 30 without being capable of modifying or otherwise processing the data packets. The access unit 30 may pass the data packets through the access unit 30 on the physical layer, using passive components only. To this end, the access unit 30 may include an internal short-circuit connection between two first ports of the access unit 30 that are connected to the HSR bus 27.

Optionally, the access unit 30 may comprise a third component 33 that is selectively engaged with the first component 31 to bring the access unit 30 to its first operational state. The third component 33 may be a passive component, having zero power consumption. The third component 33 may be configured for mechanical engagement with the passive first component 31. For a plug-socket-type connection, the plug formed by the third component 33 may be plugged into the socket formed by the first component 31 to bring the access unit 30 into its first operational state. The third component 33 may be configured to close a short-circuit connection between the first ports of the access unit 30 that are connected to the HSR bus 27, so that data packets are passed through the access unit 30 when no testing, commissioning, and/or maintenance is performed.

Access units according to exemplary embodiments will be described in more detail below. In general, the access unit 30 may have a multi-component configuration, comprising a first component that remains connected to IEDs or other devices of a SA system even when no testing, commissioning, and/or maintenance is performed, and at least one further component that can be connected to the passive first component when testing is to be performed, e.g., by mechanically engaging the at least one further component with the first component.

The access unit according to various embodiments may be a DANH (Doubly Attached Node with HSR protocol). The access unit may be a DANH in accordance with IEC 62439-3. The access unit may be a DANH in accordance with clause 5.2 of IEC 62439-3:2016.

Figure 3:
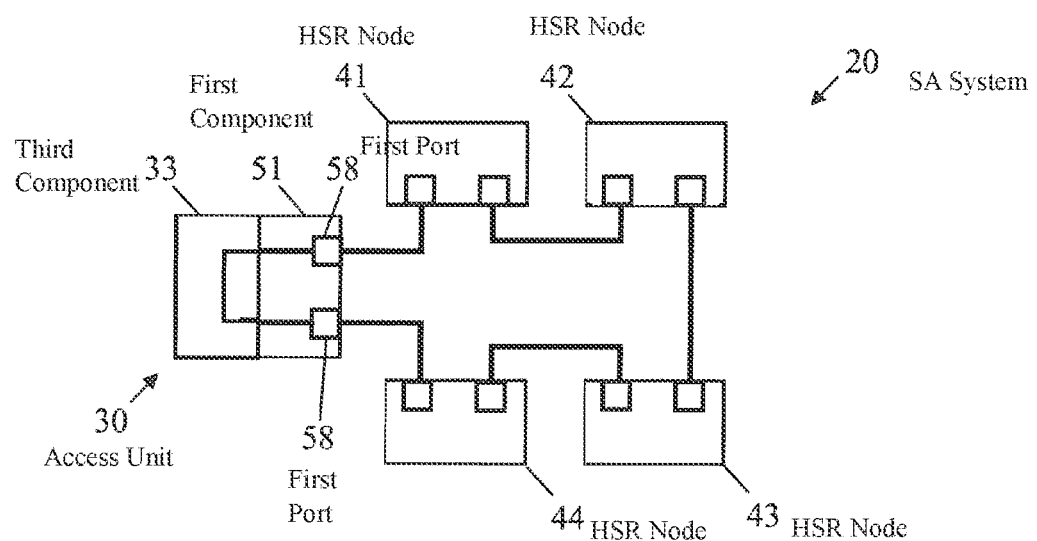
FIG. 3 is a schematic representation of a substation automation (SA) system when an access unit according to an embodiment is in a first operational state.

FIG. 3 is a schematic illustration of a SA system 20. A communication network is exemplarily illustrated to have a HSR ring topology. Plural HSR nodes 41-44 are connected to the HSR process bus. The HSR nodes 41-44 may include IEDs, MUs, or other I/O units of a SA system. The HSR nodes 41-44 may be configured in accordance with IEC 61850, in particular in accordance with IEC 61850-8-1:2011 and IEC 61850-9:2011. The HSR nodes 41-44 may be configured to communicate in accordance with IEC 62439-3:2016.

An access unit 30 is inserted into the ring topology of the HSR ring. The access unit 30 may be inserted between two of the HSR devices 41-44. The access unit 30 has a first component 51 which may be configured as explained above. The first component 51 may be a socket. When no testing, commissioning or maintenance is performed, the access unit 30 is in a first operational state as illustrated in FIG. 3. In its first operational state, the access unit 30 may be operative to pass data traffic of the communication network, e.g. data packets that are transmitted in the HSR ring between two IEDs, MUs, or other I/O devices of the SA system, through the access unit 30.

A third component 33 may be connected to the first component 51 to provide an electrical or optical short-circuit connection between first ports 58 of the passive first component 51. In use, the first ports 58 are connected to the communication network. The first component 31 and/or the third component 33 may provide a short-circuit connection between the first ports 58 at least when the access unit 30 is in the first operational state.

When the third component 33 is engaged with the first component 31, the access unit 30 closes the link between device 44 and device 41 by passing data packets through the access unit 30.

The access unit 30 may act as a Digital Substation Test Switch. The access unit 30 provides an access point for testing and maintenance tools. IEC 61850 provides several features to allow the process bus system to be tested. For illustration, IEDs may be set in test mode, or test data may be injected into the process bus in addition to the real data. The test data may include simulated data generated by a test node. In order to connect a test node to the communication network, the third component 33 may be disconnected from the first component 31, e.g. by unplugging the third component 33 from the first component 31. A second component may be connected to the first component 31 for testing, commissioning or maintenance, as will be described in more detail with reference to FIG. 5 to FIG. 9.

The access unit 30 does not need to comprise the third component 33. For illustration, the first component 31 alone or in combination with the second component may be operative to pass data traffic of the communication network through the access unit 30 between the first ports 58 of the access unit, without requiring the third component 33, as will be explained in more detail with reference to FIG. 4.

Figure 4:
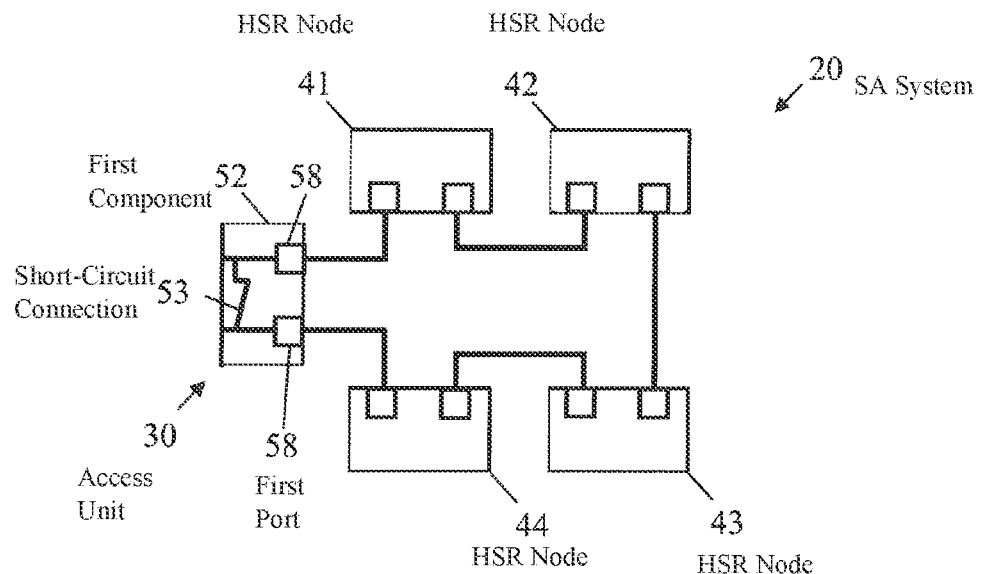
FIG. 4 is a schematic representation of a SA system when an access unit according to an embodiment is in a first operational state.

FIG. 4 is a schematic illustration of a SA system 20. The access unit 30 includes a first component 52. The first component 52 may include an electrical or optical short-circuit connection 53 integrated into a housing of the first component 52. The first component 52 may include an electrical or optical short-circuit connection 53 implemented on the physical layer that passes the data packets between the first ports 58 through the first component 52, without performing data processing and/or data manipulation on the second and/or higher layers of the OSI layer model.

Engagement of the second component with the first component 52 may automatically cause the short-circuit connection between the first ports 58 to be interrupted. Disengagement of the second component from the first component 52 may automatically cause the short-circuit connection between the first ports 58 to be re-established.

The first component 52 may be operative to pass data packets through the passive first component 52, e.g. between the nodes 41, 44, without requiring the passive third component 33 to be engaged therewith. The access unit 30 provides an access point for testing and maintenance tools, as illustrated in FIG. 5.

Figure 5:
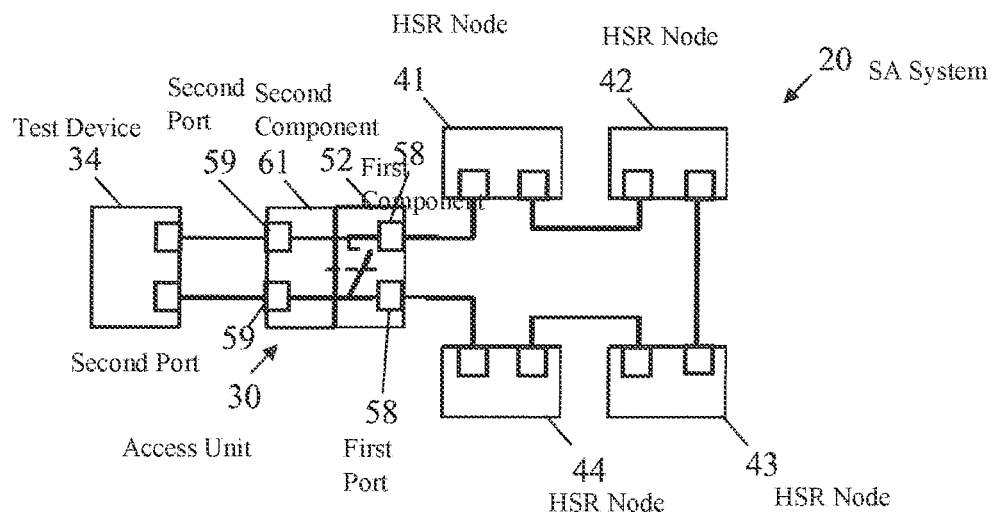
FIG. 5 is a schematic representation of the SA system of FIG. 4 when the access unit is in a second operational state.

FIG. 5 is a schematic illustration of the SA system 20 of FIG. 4 when a second component 61 of the access unit 30 is engaged with the first component 52 of the access unit 30, i.e., when the access unit 30 is in its second operational state. In the second operational state, the access unit 30 may pass data packets from the communication network to a test, commissioning, or maintenance tool, which may be executed on a test node 34. Engaging the second component 61 with the first component 52 may automatically interrupt the short-circuit connection 53 in the first component 52. The second component 61 may be a passive component, having zero power consumption. The second component 61 may pass data packets on the physical layer, without performing data processing and/or data manipulation on the DataLink layer and/or higher layers of the OSI layer model.

The second component 61 may have second ports 59 that allow a test node 34 to be connected to the communication network via the access unit 30.

The test node 34 may emulate one or several of the nodes 41-44 of the SA system 20. The test node 34 may be configured to process and/or generate messages in accordance with IEC 61850:2016. The test node 34 may be configured to process and/or generate messages in accordance with IEC 61850-8-1:2011 or IEC 61850-9-2:2011. The test node 34 may generate test data, which may be simulated data, for injection into the communication network.

The test node 34 inserted into the HSR ring via the access unit 30 keeps the HSR ring closed even during testing. The test node 34 may include or may emulate an HSR node that keeps the HSR ring closed.

Figure 6:
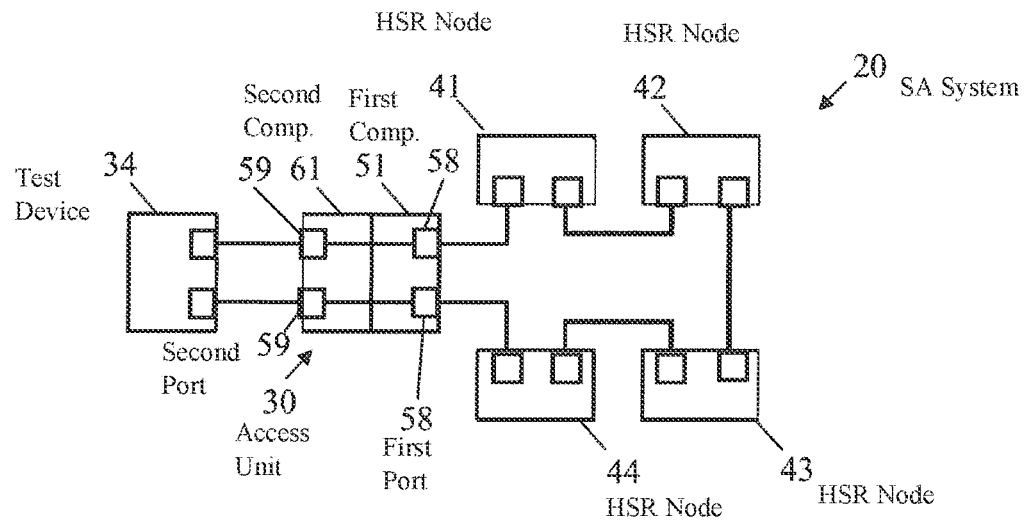
FIG. 6 is a schematic representation of the SA system of FIG. 3 when the access unit is in a second operational state.

FIG. 6 shows the SA system 20 of FIG. 3 when the second component 61 of the access unit 30 is engaged with the first component 51 of the access unit 30. The access unit 30 has first ports 58 connected to the nodes 41, 44 via the communication network links. The access unit 30 has second ports 59 that allow a test node 34 to be connected to the communication network via the access unit 30.

The second component 61 may be mechanically plugged into the first component 51. The second component 61 may be a passive component, having zero power consumption. The access unit 30 with the first component 51 and the second component 61 engaged therewith may be operative to connect a test node 34 supporting HSR to the HSR ring. The HSR node in the test node 34 closes the link between node 41 and node 44. The test node 34 can analyse traffic in both directions, i.e., in the clockwise direction and in the counter-clockwise direction of the HSR ring. Alternatively or additionally, the test node 34 can inject test data, such as simulated test data, for testing. The test data may be injected via the second component 61 and the passive first component 51 of the access unit 30. The test data are injected in the clockwise direction and in the counter-clockwise direction of the HSR ring, as desired.

In the SA systems of FIG. 5 and FIG. 6, the HSR node in the test node 34 keeps the HSR ring closed. The access unit 30 does not close the HSR link, but provides an access node that allows the test node 34 to keep the HSR ring closed. The access unit 30 may also be configured in such a way that the HSR ring is kept closed by the access unit 30 in its second operational state, as will be explained in more detail with reference to FIG. 7 to FIG. 9.

Figure 7:
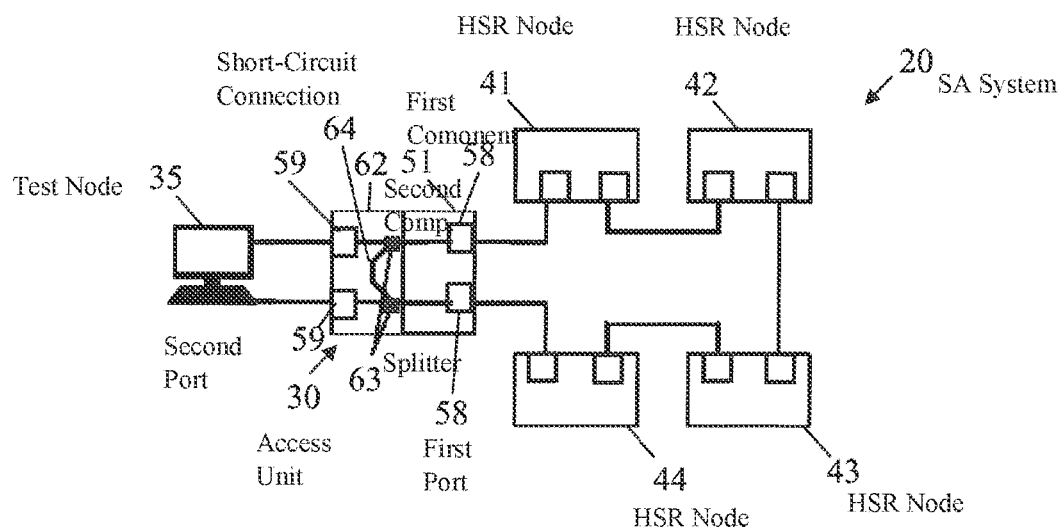
FIG. 7 is a schematic representation of a SA system when an access unit according to an embodiment is in a second operational state.

FIG. 7 is a schematic illustration of a SA system comprising the access unit 30. The access unit 30 is illustrated in its second operational state. The first component 51 may be a socket. A second component 62 may be engaged with the passive first component 51. The second component 62 may be a plug configured to be plugged into the first component 51. The second component 62 of the access unit 30 has second ports 59 that allow a test node 35 to be connected to the communication network via the access unit 30. The test node 35 may be operative to analyze data traffic and/or generate test data for injection into the communication network. The test node 35 may additionally or alternatively be operative to execute a tool for commissioning one or several of the nodes 41-44 and/or for performing maintenance work.

The access unit 30 including the first component 51 and the second component 62 engaged therewith allows a test node 35 to be connected to an HSR ring, for example. The test node 35 may, but does not need to support HSR. The second component 62 closes the link between node 44 and node 41.

The access unit 30 includes two splitters 63. The two splitters 63 may have identical configuration. The two splitters 63 may have an output coupled to an electrical or optical short-circuit connection 64. The two splitters 63 may respectively be configured to split an optical or electrical signal passing through the first component 51 in such a way that a first fraction of the intensity of the optical or electrical signal is immediately returned to the passive first component 51 via the electrical or optical short-circuit connection 64, while a second fraction of the intensity of the optical or electrical signal is output to a test node 35. The first fraction may respectively be greater than the second fraction. For illustration, the splitters 63 may respectively direct more than 50%, e.g. 90%, of the intensity into the short-circuit connection 64, while outputting less than 50%, e.g. 10%, of the intensity to the test node 35.

The access unit 30 may therefore provide a short-circuit connection between the first ports 58. The short-circuit connection between the first ports 58 may be implemented on the physical layer and may be operative to pass at least 50% of the signal intensity between the first ports 58 through the access unit 30, without processing and/or modifying the data traffic on the DataLink layer and/or even higher layers.

The test node 35 may act as a listener configured to receive and optional process data traffic of the communication network via the access unit 30. The test node 35 does not need to support HSR, because the second component 62 of the access unit 30 keeps the link between the nodes 41, 44 closed.

The second component of the access unit may, but does not need to be passive. The second component may include at least one circuit that manipulates data, such as by concentrating data, or that provides security against unauthorized usage of the access unit 30. Even when the second component of the access unit includes a circuit that actively processes and/or manipulates data, it is preferred that the access unit 30 does not use any active components having non-zero power consumption for passing data packets between the first ports 58 of the access unit 30.

Figure 8:
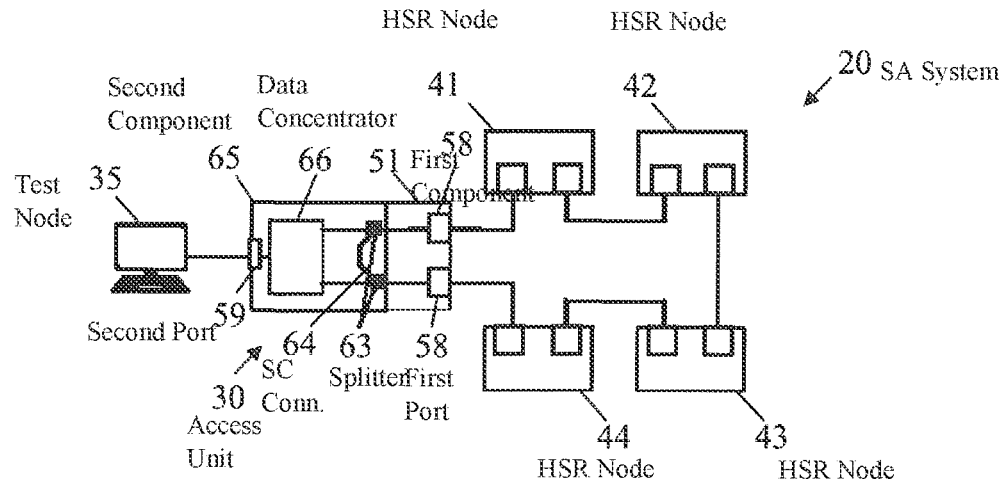
FIG. 8 is a schematic representation of a SA system when an access unit according to an embodiment is in a second operational state.

FIG. 8 shows a schematic representation of a SA system 20 which includes an access unit 30. The access unit 30 comprises a first component 51. The first component may be a passive socket. The access unit 30 comprises a second component 65 configured to be engaged with the passive first component 51. The second component 65 includes an active circuit having non-zero power consumption in operation. The second component 65 may include a data concentrator 66 as active circuit. Power for operation of the active part may be supplied by the test node 35, for example, via a Universal Serial Bus (USB) or Power over Ethernet (PoE) connection.

The test node 35 may act as a listener configured to receive and optionally process data traffic of the communication network via the access unit 30. The test node 35 does not need to support HSR, because the second component 65 of the access unit 30 keeps the link between the devices 41, 44 closed. The test node 35 may be configured to analyse traffic in both directions on one physical connection. The data concentrator 66 of the second component 65 of the access unit is configured for data alignment to one physical connection connecting the access unit 30 to the test node 35. Only passive components of the access unit 30 are used for passing the data traffic of the communication network between the first ports 58 through the access unit 30 to keep the link between devices 41, 44 closed.

While SA systems with an access unit 30 inserted into an HSR ring have been described above, the access unit 30 may be used in communication networks having other topologies. For illustration, an access unit 30 comprising the second component 62, 65 to keep a communication link between IEDs closed may be used for a SA system having point-to-point communication links.

Figure 9:
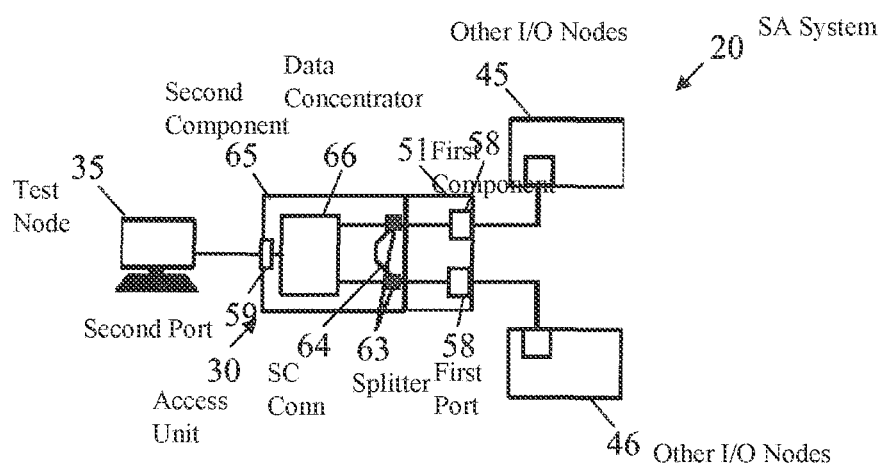
FIG. 9 is a schematic representation of a SA system when an access unit according to an embodiment is in a second operational state.

FIG. 9 shows a schematic representation of a SA system 20 comprising IEDs, MUs or other I/O nodes 45, 46 that are coupled via a point-to-point communication link. An access unit 30 comprising a first component 51 and a second component 62, 65 closes the point-to-point link when testing, commissioning and/or maintenance is performed. When no testing, commissioning and/or maintenance is performed, the second component 62, 65 may optionally be disconnected from the first component 51. The third component 63 explained with reference to FIG. 3 may be connected to the passive first component, such that the point-to-point communication link between the nodes 45, 46 is kept closed via the third component 63. Alternatively, the second component 62, 65 may keep the point-to-point communication link between the devices 45, 46 closed also during normal operation of the SA system.

The first component, the second component and, where present, the third component of the access unit may have various configurations. Exemplary configurations will be described with reference to FIG. 10 to FIG. 17.

FIG. 10 to FIG. 13 are schematic views of the first component 51-54 of an access unit 30. The first component 51-54 remains installed in the communication network of the SA system even when no testing, commissioning and/or maintenance is performed. The first component 51-54 may respectively have a housing 70. The housing 70 may define a recess or plural recesses (not shown), causing the first component 51-54 to have a socket-type configuration. The housing 70 may be configured for mounting to a standardized rail 71, such as a DIN rail.

An indicator mechanism 72 may be operative to indicate whether the second component or third component is disengaged from the first component 51-54 and/or whether the second component is properly installed for testing. This indication may be used to indicate to the SA system or to another industrial installation that maintenance or testing activities are performed. The indicator mechanism 72 may comprise a mechanical contact, for example. The indicator mechanism 72 may be electrically coupled to the SA system or to another industrial installation.

The first ports 58 of the access unit 30 may have various configurations, as will be explained in more detail below. Similarly, when the access unit 30 has a multi-component configuration, the first component 31 may have two third ports configured to be connected to two fourth ports of the second or third component 32, 33 of the access unit 30.

Figure 10:
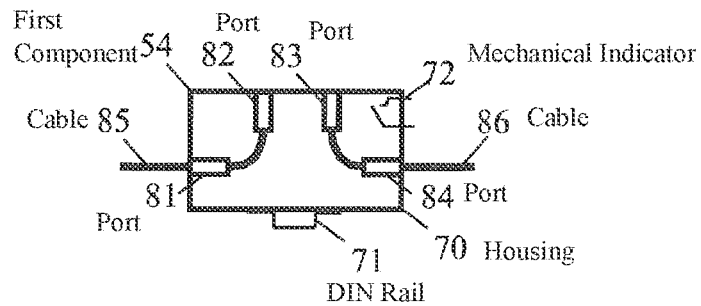
FIG. 10 to FIG. 13 are schematic representations of a passive first component of an access unit according to an embodiment.

FIG. 10 is a schematic view of a first component 54 of an access unit 30 that comprises ports 81, 84, such as male or female connectors, for coupling with mating connectors on cables 85, 86 of the communication network. The cables 85, 86 may use electrical connections or optical fibers on the physical layer. The passive first component 54 of the access unit 30 may comprise first ports having ports 82, 83 for electrically or optically connecting the passive first component 54 to the second component engaged with the passive first component 54 for testing, commissioning or maintenance, or with the third component engaged with the passive first component 54 during normal operation when no testing, commissioning or maintenance is performed.

Figure 11:
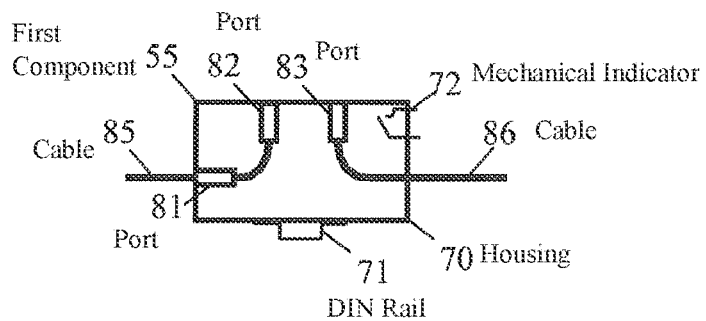

FIG. 11 is a schematic view of a first component 55 of an access unit 30. A cable 86 may extend from the passive first component 55 for connecting the access unit 30 to an IED, a MU, or another I/O unit of a SA system. The cable 86 may terminate at a port 83 for electrically or optically connecting the passive first component 55 to the second component engaged with the passive first component 55 for testing, commissioning or maintenance, or optionally with the third component engaged with the passive first component 55 during normal operation in which no testing, commissioning or maintenance is performed.

Figure 12:
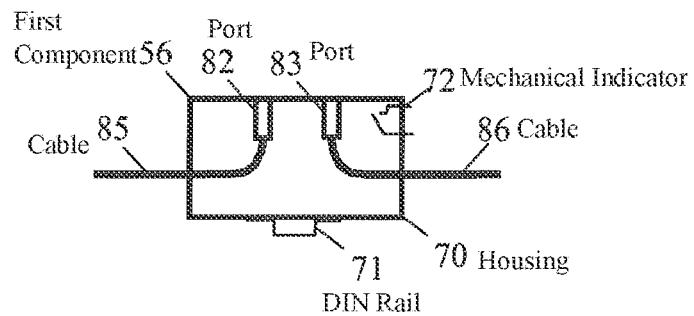

FIG. 12 is a schematic view of a first component 56 of an access unit 30. Cables 85, 86 may extend from the passive first component 56 for connecting the access unit 30 with LEDs, MUs, or other I/O units of a SA system, for example. The cables 85, 86 may terminate in ports 82, 83 for electrically or optically connecting the passive first component 56 to the second component engaged with the first component 56 for testing, commissioning or maintenance, or optionally with the third component engaged with the passive first component 56 during normal operation in which no testing, commissioning or maintenance is performed.

Figure 13:
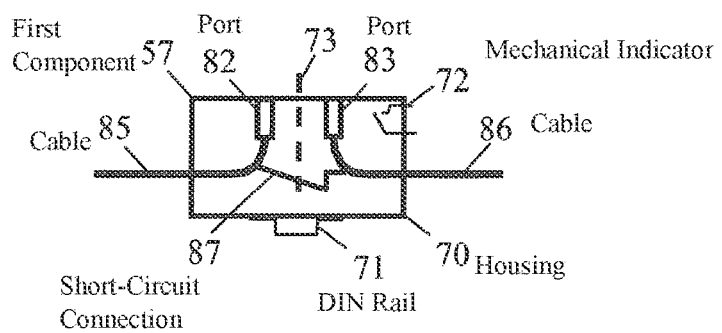

The passive first component 54-56 may respectively be modified to include an internal short-circuit connection 87 for closing a communication link of the SA system through the passive first component 54-56. FIG. 13 illustrates a first component 57 that is generally similar to the passive first component 54 illustrated in FIG. 12, but which additionally includes the internal short-circuit connection 87. An interruption mechanism 73 may be triggered by engagement of the second component with the passive first component 57 of the access unit, causing the short-circuit connection 87 to be interrupted. The internal short-circuit connection 87 and the interruption mechanism 73 may be similarly provided on any one of the passive first components of FIG. 10 to FIG. 12, for example.

Figure 14:
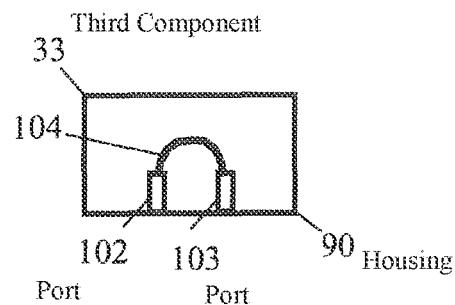
FIG. 14 is a schematic representation of a passive third component of an access unit according to an embodiment.

FIG. 14 is a schematic view of a third component 33 of an access unit 30. The third component 33 may be engaged with the passive first component of the access unit 30 in the first operational state of the access unit 30, when no testing, commissioning or maintenance is to be performed. The third component 33 is generally operative to close a communication link of the communication network of the SA system. To this end, the third component 33 may comprise an electrical or optical connection 104 connected to fourth ports 102, 103 of the third component 33. The fourth ports 102, 103 may include male or female connectors configured for connecting to the first component of the access unit. The third component 33 may support an Ethernet standard selected from the group consisting of 10BaseTx, 100BaseTx, 1000BaseTx, 100BaseFx, and 1000BaseFx. The connection 104 may accordingly be based on an electrical connection or an optical fiber, depending on the supported standard. The third component 33 comprises a housing 90. The housing 90 may have a male engagement feature, such as a projection, for engaging a corresponding female engagement feature of the passive first component of the access unit 30 to implement a plug-socket-type connection.

Figure 15:
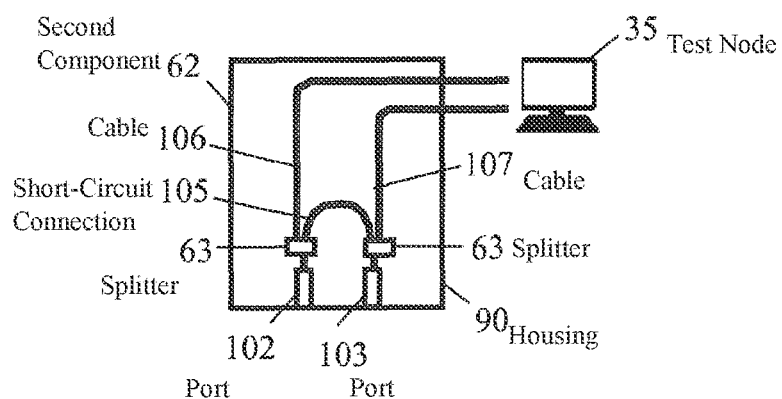
FIG. 15 to FIG. 17 are schematic representations of a passive first component of an access unit according to an embodiment.

FIG. 15 is a schematic view of a second component 62 of an access unit 30. The second component 62 may be connected to the first component of the access unit 30 in the second operational state of the access unit 30, when testing, commissioning or maintenance is to be performed. The second component 62 may have a plug configuration for insertion into the socket of the first component. The second component 62 may be a passive component having zero power consumption. The second component 62 may comprise two splitters 63. A short-circuit connection 105 between the two splitters 63 may keep a communication link of the communication network closed while testing, commissioning or maintenance is performed, passing the data packets between the first ports 58 of the access unit 50.

The two splitters 63 may respectively be configured to split an optical or electrical signal in such a way that a first fraction of the intensity of the optical or electrical signal is immediately returned to the first component of the access unit via the electrical or optical short-circuit connection 105, the other splitter 63, and one of the ports 102, 103, while a second fraction of the intensity of the optical or electrical signal is output to a test node via cables 106, 107. The first fraction may respectively be greater than the second fraction. For illustration, the splitters 63 may respectively direct more than 50%, e.g. 90%, of the intensity into the electrical or optical short-circuit connection 105, while outputting less than 50%, e.g. 10%, of the intensity via cables 106, 107 to the test node 35. The second component 62 may be used to connect a test node 35 that does not need to support HSR to an HSR ring, for example, because the HSR ring can be kept closed via the electrical or optical short-circuit connection 105. The second component 62 may also be used in the first operational state of the access unit to keep the communication link between devices of the SA system closed. The second component 62 may support an Ethernet standard selected from the group consisting of 100BaseFx and 1000BaseFx, for example.

Figure 16:
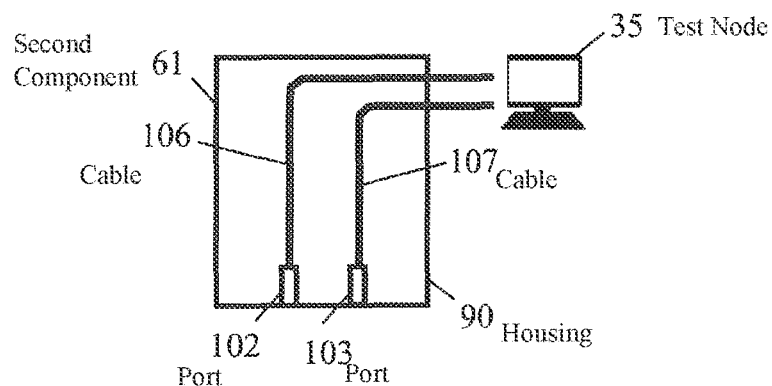

FIG. 16 is a schematic view of a second component 61 of an access unit 30. The second component 61 may be connected to the first component of the access unit 30 in the second operational state of the access unit 30, when testing, commissioning or maintenance is to be performed. The second component 61 may have a plug configuration for insertion into the socket of the first component. The second component 61 may be a passive component having zero power consumption. The second component 61 may pass data traffic to the test node 35 via cables 106, 107 connected to the ports 102, 103. The second component 61 may be configured to connect a test node 35 that implements an HSR node to an HSR ring, because the HSR ring in the test node 35 can keep the HSR ring closed. The second component 61 may support an Ethernet standard selected from the group consisting of 10BaseTx, 100BaseTx, 1000BaseTx, 100BaseFx, and 1000BaseFx.

Figure 17:
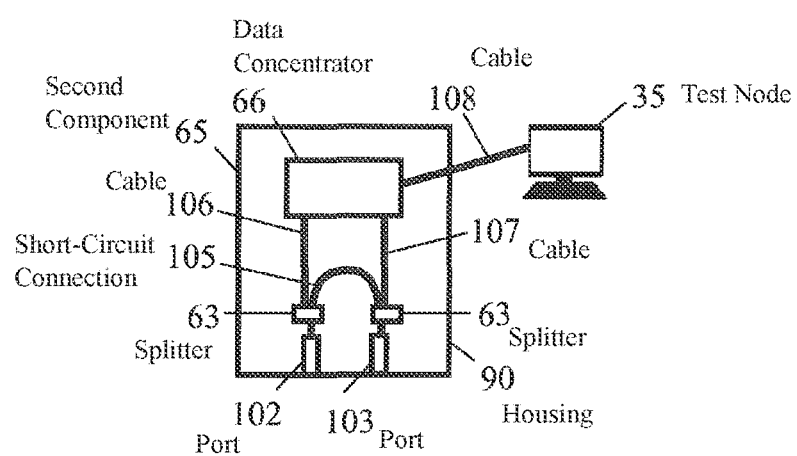
Figure 18:
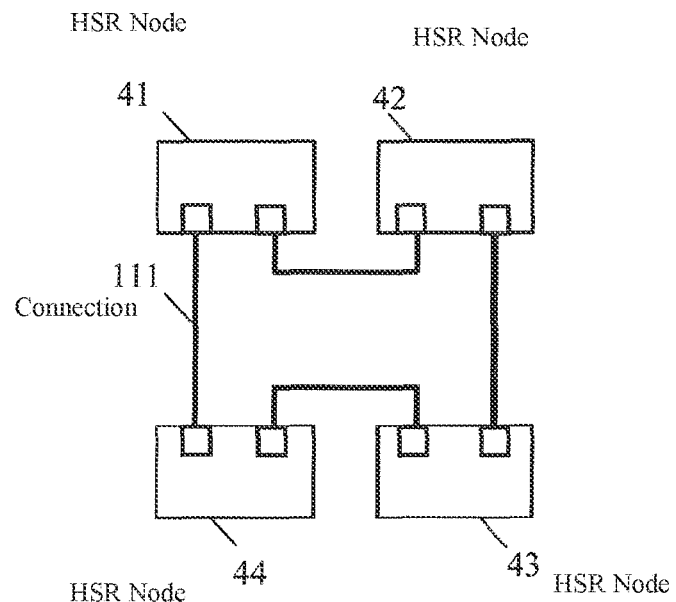
FIG. 18 and FIG. 19 are schematic representations of a conventional SA system.
Figure 19:
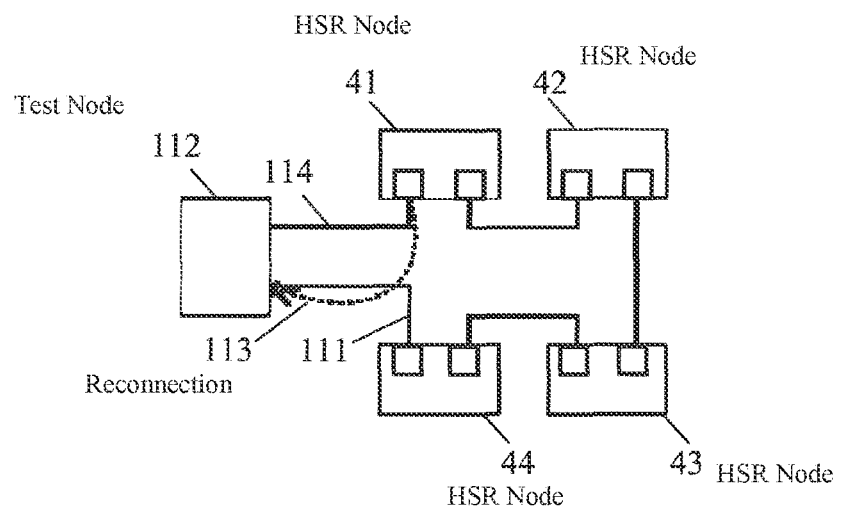

FIG. 17 is a schematic view of a second component 65 of an access unit 30. The second component 65 has a configuration that is generally similar to the second component 62 explained with reference to FIG. 15. However, the second component 65 may include an active circuit. The active circuit may be a data concentrator 66. The data concentrator 66 of the second component 65 of the access unit may be configured for the data alignment to one physical connection 108 to the test node 35. Only passive components of the second component 65 are used for passing the data traffic of the communication network between the first ports 58 through the access unit 30. The second component 65 may be implemented based on electrical connections, which may be determined by a commissioning tool. For illustration, the physical connection 108 may be a USB connection or a PoE connection that supplies the active part of the second component 65 with power. The second component 65 may also use optical connections, e.g. for the short-circuit connection 105, with the splitters 63 being optical splitters. The second component 62 may support an Ethernet standard selected from the group consisting of 10BaseTx, 100BaseTx, 1000BaseTx, 100BaseFx, and 1000BaseFx. The second component 62 may be used for commissioning, with the test node 35 listening to data traffic only, or for normal operation in which the test node 35 may be disconnected.

While embodiments of the invention have been described with reference to the drawings, modifications may be implemented in other embodiments. For illustration, while multi-component access units including mating plug-socket-type components have been described, other mating components may be used. For further illustration, while the access unit may include a second component that allows a test node to be coupled to the communication network of a SA system during testing, commissioning or maintenance, the second component does not need to be disengaged from the passive first component during normal operation, but may also be operative to pass data traffic between IEDs of the SA system using passive elements only.

The access unit according to an embodiment generally fulfils a purpose that is similar to that of a test switch of a non-digital SA system, but that is tailored to the demands and requirements of a digital substation or another industrial installation that comprises a communication network in accordance with 62439-3 or IEC 61850-8-1 and IEC 61850-9-2.

The access unit may be operative to pass Ethernet data traffic between IEDs through the access unit, at least during normal operation and, optionally, also during testing, commissioning and maintenance activities. The access unit provides an Ethernet test plug for a SA system that allows a test node or other tool to be coupled to the communication network for testing, commissioning and/or maintenance activities, while mitigating the problems associated with direct insertion of a test node into the communication network in conventional approaches.

The access unit of any embodiment disclosed herein may include a safety mechanism to prevent unauthorized flooding of the communication network. The safety mechanism may include a mechanical mechanism that allows only specific, authorized second components to be engaged with the passive first component, similar to a key-lock-mechanism. The safety mechanism may alternatively or additionally include an electronic authentication mechanism that may be provided in the access unit to prevent fraudulent manipulation of data traffic in the SA system.

While embodiments have been described in the context of a SA system, the access unit may also be used for other industrial communication networks.

The access unit according to any one of the embodiments may be a DANH (Doubly Attached Node with HSR protocol), without being limited thereto.

The access unit of any embodiment disclosed herein may be particularly suitable for use with a SA system that includes an HSR ring or point-to-point communication links or other non-switched communication networks, without being limited thereto. The access unit of any embodiment disclosed herein allows testing, commissioning or maintenance activities to be performed, without requiring the physical data connections of the IEDs, MUs or other I/O units to be changed to perform the testing, commissioning or maintenance activities.

While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

LIST OF REFERENCE SIGNS 10 digital substation
11, 12 bus bar
13-16 circuit breaker
17 current transformer
18 voltage transformer
20 SA system
21 communication network
22 Breaker IED (BIED)
23, 24 merging unit (MU)
25, 26 Intelligent Electronic Device (IED)
30 access unit
31 first component
33 second component
34 test device
41-44 HSR node
31 first component
33 first component
34 short-circuit connection
54-57 first component
58 first port
59 second port
61 second component
62 second component
63 splitter
64 short-circuit connection
65 second component
66 data concentrator
70 housing
71 DIN rail
72 mechanical indicator
73 interruption mechanism
81-84 port
85, 86 cable
87 short-circuit connection
90 housing
102, 103 port
105 short-circuit connection
106-108 cable
111 connection
112 test node
113 reconnection
114 inserted additional connection

The invention claimed is:

1. A method of accessing an industrial communication network using an access unit, the access unit comprising a first component having first ports connected to the industrial communication network, and comprising at least one further component releasably connectable to the first component and having at least one second port, the method comprising:
    passing data traffic between nodes of the industrial communication network through the access unit between the first ports of the access unit in a first operational state of the access unit in which no testing is performed, in which the at least one further component is disengaged from the first component, and in which the data traffic is passed between the first ports of the access unit through the access unit using only passive components, the passive components themselves not requiring a power supply to operate;
    mechanically engaging the at least one further component to the first component to communicatively couple the at least one second port to the first ports, and to set the access unit to a second operational state: and
    passing the data traffic to a test node from the first ports through the at least one second port of the access unit and/or allowing test data to be injected into the industrial communication network through the at least one second port of the access unit to the first ports, in the second operational state of the access unit, the at least one second port being connected to the test node.

2. The method of claim 1, wherein the at least one further component comprises a second component having the at least one second port, the second component being connected to the first component in at least the second operational state of the access unit to pass the data traffic to the test node and/or to allow the test data to be injected into the industrial communication network via the at least one second port of the access unit.

3. The method of claim 2, wherein the access unit comprises a third component, the third component being connected to the first component in the first operational state of the access unit to pass the data traffic between the nodes between the first ports of the access unit through the access unit.

4. The method of claim 1, further comprising:
performing an authentication procedure when the at least one further component is connected to the first component to prevent unauthorized access to the industrial communication network.

5. The method of claim 4, wherein the at least one further component comprises a second component having the at least one second port, the second component being connected to the first component in at least the second operational state of the access unit to pass the data traffic to the test node and/or to allow the test data to be injected into the industrial communication network via the at least one second port of the access unit.

6. The method of claim 5, wherein the access unit comprises a third component, the third component being connected to the first component in the first operational state of the access unit to pass the data traffic between the nodes between the first ports of the access unit through the access unit.

7. The method of claim 1, wherein the access unit comprises a third component, the third component being connected to the first component in the first operational state of the access unit to pass the data traffic between the nodes between the first ports of the access unit through the access unit.

8. The method of claim 1, wherein the industrial communication network is a communication network in accordance with IEC 62439-3 or IEC 61850.

9. The method of claim 8, further comprising: performing an authentication procedure when the at least one further component is connected to the first component to prevent unauthorized access to the industrial communication network.

10. An access unit for accessing an industrial communication network, the access unit comprising:
a first component having first ports configured to be connected to the industrial communication network, wherein the access unit is configured to pass data traffic between nodes of the industrial communication network through the access unit between the first ports of the access unit in a first testless operational state of the access unit using only passive components, the passive components themselves not requiring a power supply to operate; and
at least one further component having at least one second port configured to be connected to a test node, wherein the access unit is configured to pass the data traffic to the test node from the first ports through the at least one second port and/or allow test data to be injected into the industrial communication network through the at least one second port to the first ports, in a second operational state of the access unit, and wherein the at least one further component is releasably connectable to the first component to set the access unit to the first testless operational state when mechanically disengaged or to the second operational state when mechanically engaged to the first component.

11. The access unit of claim 10, wherein the at least one further component comprises a second component configured to be connected to the first component in the second operational state of the access unit, the second component having the at least one second port to pass the data traffic to the test node and/or to allow the test data to be injected into the industrial communication network.

12. The access unit of claim 11, wherein the at least one further component comprises a third component configured to be releasably connected to the first component in the first testless operational state of the access unit to enable the data traffic to pass between the first ports of the access unit through the access unit.

13. The access unit of claim 10, wherein the first component includes a socket and the at least one further component includes a plug mating with the socket for connecting the at least one further component with the first component.

14. The access unit of claim 13, wherein the at least one further component comprises a second component configured to be connected to the first component in the second operational state of the access unit, the second component having the at least one second port to pass the data traffic to the test node and/or to allow the test data to be injected into the industrial communication network.

15. The access unit of claim 10, wherein the access unit comprises a splitter.

16. A kit for accessing the industrial communication network, the kit comprising:
the access unit of claim 10; and
the test node, configured to be connected to the access unit to analyse the data traffic between the nodes of the industrial communication network and/or to generate the test data for injection into the industrial communication network.

17. A digital substation, comprising:
a plurality of Intelligent Electronic Devices, IEDs;
a communication network to which the IEDs are coupled; and
the access unit of claim 10 coupled to the communication network, wherein the first ports of the access unit remain permanently connected to the communication network.

18. The access unit of claim 10, wherein the at least one further component comprises a third component configured to be releasably connected to the first component in the first testless operational state of the access unit to enable the data traffic to pass between the first ports of the access unit through the access unit.

19. The access unit of claim 18, wherein the first component includes a socket and the at least one further component includes a plug mating with the socket for connecting the at least one further component with the first component.

20. The access unit of claim 10, wherein the first component is a has additional ports configured to electrically or optically connect the first component to the at least one further component.

* * * * *

UNITED STATES PATENT AND TRADEMARK OFFICE
CERTIFICATE OF CORRECTION

| | | |
|---|---|---|
| PATENT NO. | : 11,558,279 B2 | Page 1 of 1 |
| APPLICATION NO. | : 16/683366 | |
| DATED | : January 17, 2023 | |
| INVENTOR(S) | : Dominique Graber | |

It is certified that error appears in the above-identified patent and that said Letters Patent is hereby corrected as shown below:

In the Claims

Claim 20, Column 20, Line 58; delete "is a".

Signed and Sealed this
Fourteenth Day of February, 2023

Katherine Kelly Vidal
*Director of the United States Patent and Trademark Office*